US008296585B2

(12) United States Patent
Cai et al.

(10) Patent No.: US 8,296,585 B2
(45) Date of Patent: Oct. 23, 2012

(54) METHOD OF ENCRYPTING/DECRYPTING THE DOCUMENT AND A SAFETY MANAGEMENT STORAGE DEVICE AND SYSTEM METHOD OF ITS SAFETY MANAGEMENT

(75) Inventors: Huabo Cai, Shenzhen (CN); Xuyang Zhu, Shenzhen (CN)

(73) Assignee: Shenzhen Netcom Electronics Co., Ltd., Shenzhen (CN)

( * ) Notice: Subject to any disclaimer, the term of this patent is extended or adjusted under 35 U.S.C. 154(b) by 1159 days.

(21) Appl. No.: 12/067,650

(22) PCT Filed: Sep. 22, 2006

(86) PCT No.: PCT/CN2006/002491
§ 371 (c)(1),
(2), (4) Date: Mar. 20, 2008

(87) PCT Pub. No.: WO2007/033604
PCT Pub. Date: Mar. 29, 2007

(65) Prior Publication Data
US 2008/0215881 A1 Sep. 4, 2008

(30) Foreign Application Priority Data
Sep. 22, 2005 (CN) .......................... 2005 1 0037541

(51) Int. Cl.
*G06F 21/00* (2006.01)
(52) U.S. Cl. ........................... 713/193; 713/152; 726/26
(58) Field of Classification Search ........................ None
See application file for complete search history.

(56) References Cited

U.S. PATENT DOCUMENTS

| | | | |
|---|---|---|---|
| 2003/0187661 A1 | 10/2003 | Warren et al. | |
| 2005/0015540 A1* | 1/2005 | Tsai et al. ....................... | 711/103 |
| 2005/0175182 A1* | 8/2005 | Ueno et al. ..................... | 380/277 |
| 2005/0210271 A1* | 9/2005 | Chou et al. ..................... | 713/186 |
| 2005/0210278 A1* | 9/2005 | Conklin et al. ................ | 713/194 |
| 2005/0268339 A1* | 12/2005 | Bobrow .......................... | 726/26 |
| 2006/0149972 A1 | 7/2006 | Deng et al. | |
| 2007/0186287 A1* | 8/2007 | Slade .............................. | 726/27 |
| 2008/0192928 A1* | 8/2008 | Yu et al. ......................... | 380/44 |
| 2008/0270807 A1* | 10/2008 | Forlenza et al. ................ | 713/193 |
| 2011/0082979 A1* | 4/2011 | Ramesh et al. ................ | 711/115 |

FOREIGN PATENT DOCUMENTS
EP 1657645 A1 5/2006
* cited by examiner

*Primary Examiner* — Eleni Shiferaw
*Assistant Examiner* — Jeffery Williams
(74) *Attorney, Agent, or Firm* — North Oaks Patent Agency; Shawn B. Dempster

(57) ABSTRACT

A method of encrypting/decrypting the document and a safety management storage device and system method of its safety management, using for the safety management of electronic documents, the said system comprising a PC or mainframe installed with common reading software and a storage device of safety management connected to the said PC/mainframe through hot-plug; when connected to the mainframe, the said storage device is enumerated as a USB CDROM device at least. The user owns the said storage device can encrypt the electronic documents by using the encryption keys to generate an encrypted document with the same file type, also can open the encrypted document by using common reading software, and then use the document according to the predetermined operation authority. By using present invention, the users and the range of using the documents will be limited through the control of the distribution of the said storage devices, thus, a document safety management system with high security and easy-use will be established, and with the advantage of easy control, low cost of investment and maintenance.

3 Claims, 4 Drawing Sheets

METHOD OF ENCRYPTING/DECRYPTING THE DOCUMENT AND A SAFETY MANAGEMENT STORAGE DEVICE AND SYSTEM METHOD OF ITS SAFETY MANAGEMENT

RELATED APPLICATIONS

The present application is a 35 U.S.C. §371 national phase application of PCT International Application No. PCT/CN2006/002491, having an international filing date of Sep. 22, 2006, which was published in the English language as PCT International Publication No. WO 2007/033604, and claims priority to Chinese patent application Serial No. 200510037541.2, filed Sep. 22, 2005, which are incorporated herein by reference.

FIELD OF THE INVENTION

The present invention relates to the electronic digital data processing technology, especially relates to the encryption and decryption of the document and the storage device and system method of its safety management.

BACKGROUND OF THE INVENTION

Nowadays, most of the confidential information of the enterprises is loaded in the carrier such as electronic document, and the electronic document can be handed out easily. The enterprises can prevent the outsider from accessing the confidential document with the aid of setting up a fire wall or establishing a special net, but these measures can not prevent the leakage of secret resulted from the secondary propagation of the electronic document. The leaders of the company have a lot of misgivings toward the safety of these electronic documents:

How to prevent the confidential information, such as documents of the board of directors, program budget, purchase and separation from being disclosed?

How to prevent the key person from copying the confidential document while demission?

Through what kind of technical means can those high-leveled staff deliver the document information between each other trustfully?

How to prevent the tender and price list from being leaked unconsciously to competitor after being affected by the virus?

How to find the telltale channels after the leakage happened?

Aiming at the problems above, the effect of the password encryption which is used till now in document tools such as WORD and PDF is limited, therefore, software companies put out many solutions. Some systems such as the Alpab document publishing system that produced by the Beijing Founder Electronic Co. Ltd and the safety management system of document that produced by the Shanghai Frontiertech Co. Ltd are more famous. Both of them adopt high intensity methods of encrypting documents, preserving the encrypted document in the management server of the document inside the enterprises, and then realizing the safety management through the special software in the document server port and client port, thereby controlling the operation which aiming at the documents of read, print, modification, reserve, anti-copy and screen shot etc. As for the confidential document which is lost at the second propagation, the operator can not open it because of lacking special software and key.

FIG. 1 is the organization sketch of the safety management system of document produced by the Frontiertech. The structure of the system is as said above, and can realize the function in the following:

Control the legal users' access right of operating the document, including print, copy and preservation, then prevent the document from spreading at the second propagation.

It has dynamically centralized authority management in the system, the access rights that have been distributed to the users can be withdrew or modified.

The encrypted documents that have been leaked to the outside can not be opened by everyman.

The operating platform can be established on plenty of operation system bases, such as Windows 98/Me/2k/Xp/2003.

Different kinds of office software (such as WORD, EXCEL) of the Microsoft company and other popular software (like but not limit to: PDF, AutoCAD) that used to handling variety of formatted text or picture file can be supported.

The international standard AES-128 of the cryptographic algorithm can be adopted to encrypt the document.

The OAS, such as Domino, AD, PKI, KM and so on, can be integrated at the same time.

The detailed access record of the document can be generated.

The capture or interception of the confidential information by using the screen copy key or screen shot software can be limited.

FIG. 2 is the inner framework sketch of the said system. It adopts the client-server structure, comprising EDG server and EDGViewer software which is installed on the client port, while using the document at the client port, the said software can realize following functions:

The print and copy of the document can be controlled (only the authorized can print and copy).

The operation of preservation and save copy as can be controlled (only the authorized can preserve).

The use of screen copy or screen shot software can be limited or prevented.

The effective hours of using the document can be controlled.

The said software can realize additional senior functions:

On the premise of limiting the user' read, appointing the machine that used for reading (such as, realize it through binding the machine hardware fingerprint).

Monitor the use's operation, and track down the telltale channels combined with the watermark technology.

The above-mentioned present art of document safety management have higher security while being used in the inner net, but it still has several insurmountable shortcomings:

1. The said system of the client-server structure generally preserves encrypted document and the encryption key of each encrypted document in the document server, limiting the use of the inside document within the trusty range in the outside. For example, the production component list or other technical information of an enterprise can not be used by the production plant, cooperative partner and the inner employees at home or on business trip.

2. The encrypted document preserved by the said document server is the special formatted document which got by encrypting and transforming the normal document, its easy-to-use function is bad, so it need a special document reading software. Therefore the more complicated software is needed to be installed both on the client port and server port.

3. The security of the said special document reading software becomes the focus and weak point of the said system, if it is attacked or broken, the document management of the said system will lose security.
4. The cost of investing and maintaining the document server and the whole document safety management software is high, so that the small enterprises and individual users can not afford it.

BRIEF SUMMARY OF THE INVENTION

Aiming at the shortcomings of the above-mentioned technologies, the technical matters that present invention has to solve is to put forward a method of encrypting/decrypting the document and a storage device and system method of its safety management, providing for users a safety management method of office document and confidential document with high security, easy use and low cost, and meanwhile solve the disclosure problems of secondary propagation of the document, as well as permit the inside document used within the trusty range in the outside.

In order to solve the above-mentioned technical matters, the basic conception of the present invention is: the document governors can encrypt an electronic document which contains confidential information by encryption key, and generate an encrypted document of the same type of the file; the document governors can use the portable equipment (such as, storage device with USB interface) with data protection function to carry and distribute the encryption authorization and the use rights of the document; Only those who have the said storage device (including the document governor and other trusty users) can open the said encrypted document with the help of a common text, picture or music reading software, such as (but not limit to) Microsoft Word, Acrobat Reader, ACDsee, Winamp or Realplay. In order to facilitate the centralized dynamic management of the authority, the authority saved in the said storage device can be updated through the net or PC/mainframe. In this way, the user and the range of using the document can be limited through controlling the distribution of the portable equipment, and various kinds of confidential electronic document can be guaranteed to receive high-intensity protection through mutual coordination of hardware and encryption software, and the safe authority management of read, print, duplication, save as and screen shot etc. can be realized.

The first technical scheme of realizing the conception of the present invention is to put forward a method of encrypting the document for the safety management of the electronic document, the steps comprise:
A. Set up or install the encryption program on a PC or mainframe;
B. Operate the PC/mainframe to read the data of an electronic document which will be encrypted;
C. Encrypt the said data by using an encryption key;
Especially comprising the step:
D. Generate an encrypted electronic document which has the same file type as the said electronic document.

The second technical scheme of realizing the conception of the present invention is to put forward a method of decrypting the document for the safety management of the electronic document, the steps comprise:
A. Download or store the encrypted electronic document into the storage unit of a PC or mainframe;
B. Finish the installation of a common reading software corresponding to the file type of the said electronic document on the said PC/mainframe;
Especially comprising the step:
C. Connect a storage device with the content of decryption authority to the said PC/mainframe;
D. The storage device is recognized by the said PC/mainframe, the document decryption program which is in the said storage device is run automatically;
E. The said document decryption program automatically take over the scheduled operation run by the said common reading software;
F. Run the said common reading software to open the said encrypted electronic document, operate the document within the predetermined range of the rights.

The third technical scheme of realizing the conception of the present invention is to put forward a safety management storage device for the safety management of the electronic document, comprising a USB interface circuit, control unit and storage unit connecting with the said control unit, especially comprising an integrated circuit module connected with the said control unit, providing a unique identifier which can distinguish the said device from other same kind of devices.

The fourth technical scheme of realizing the conception of the present invention is to put forward a safety management system of the electronic document, comprising a personal computer or mainframe which installed with a common reading software, especially comprising a storage device of safety management can be connected with the said PC/mainframe by hot plugging; the said storage device comprises a USB interface circuit, control unit and a storage unit connecting with the said control unit, and an integrated circuit module connecting with the said control unit providing a unique identifier that can distinguish the said storage device from the other same kind of devices; While connected with the said PC/mainframe, the said storage device should be enumerated as a USB CDROM device at least.

The fifth technical scheme of realizing the conception of the present invention is to put forward a safety management methods of electronic document, especially comprising the steps:
A. Set up at least a storage device of safety management, write at least one encryption or decryption key into its storage unit.
B. Distribute the said storage device of safety management to the predetermined users;
C. The said predetermined users connect the said storage device of safety management to a PC/mainframe with Windows operation system, then the said device should be enumerated as a USB CDROM device at least by the system;
D. The loading program, in the said storage device of safety management, inject the encryption or decryption module into the scheduled program process of the said common reading software in the PC/mainframe operation system through the technology of remote thread injection and the technology of function hook, so as to take over the scheduled operation ran by the said common reading software;
E. The said predetermined users encrypt the electronic document of predetermined file type to generate encrypted electronic document with the same file type, or open the encrypted electronic document of the predetermined file type by using the said common reading software; Wherein, the said predetermined file type is the sustainable file type of the said common reading software.

Adopting the above-mentioned technical schemes, a safety management system of document with high security and easy use can be established, without the need of installing the special safety management software of the document and with the advantages of high controllability and low cost of investment and maintenance.

DETAILED DESCRIPTION

The present invention is further described in the following, combining with the most preferable embodiment shown in the figures.

Figure 1:
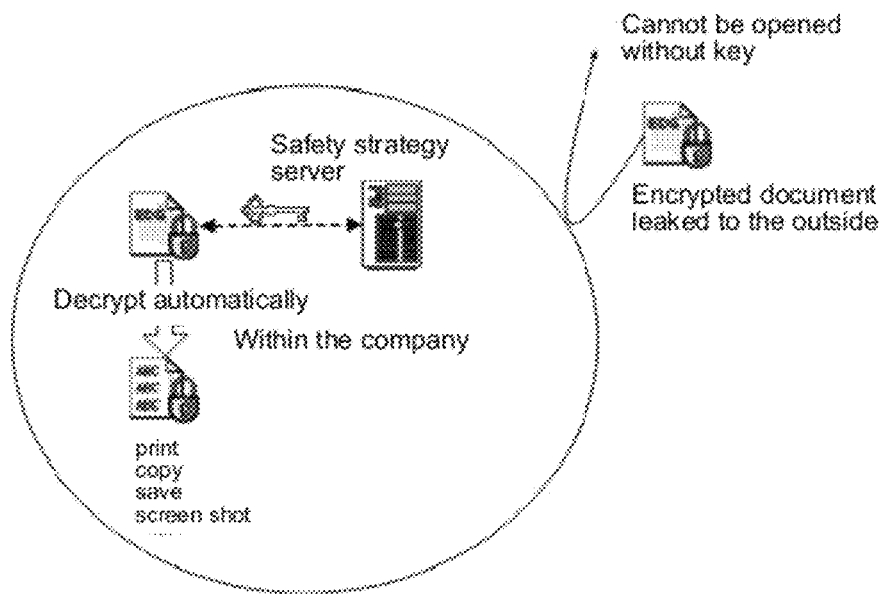
FIG. 1 is the organization sketch of safety management system of document produced by the Frontiertech.
Figure 2:
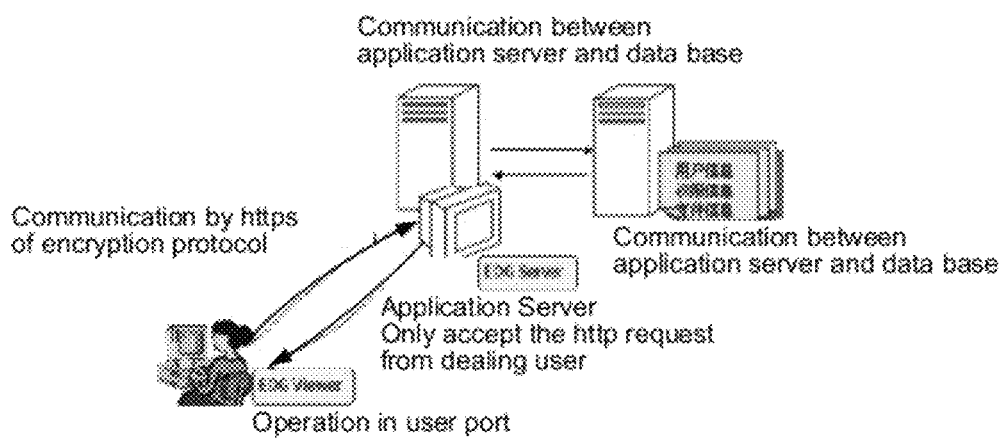
FIG. 2 is the inner framework sketch of the system in FIG. 1
Figure 3:
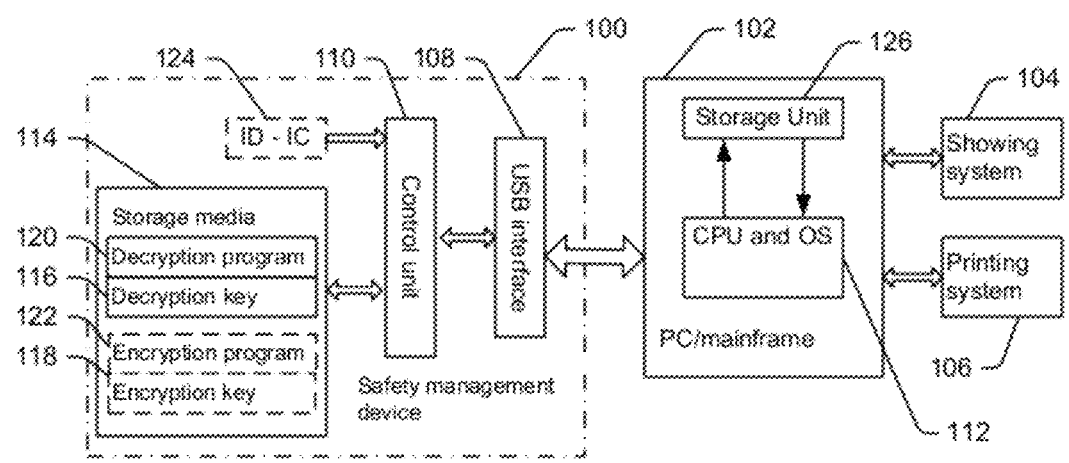
FIG. 3 is the sketch of the safety management system of document of the present invention.

The safety management of the document of present invention shown in FIG. 3, comprising a storage device 100 of safety management, PC or mainframe 102 (hereafter referred to as simply PC/mainframe or mainframe) installed with a common reading software and ancillary equipment such as a printer 106 or monitor 104 etc.; the said storage device 100 of safety management is the key element of the system to realize the safety management of the document, it is set as a "USB mass storage device" device (aiming at the environment of WINDOWS operation system) in advance, comprising a USB interface circuit 108 and control unit 110, thus, it can be connected to the mainframe by hot plugging. While the device 100 is connected to the mainframe 102, it can be detected by the mainframe operation system 112 and be enumerated at least as a USB CDROM device according to the protocol, (since it is the present art that conforming to the USB standard and the WINDOWS operation system environment, unnecessary details are not given here). The said storage device 100 of safety management can also adopt other interface circuits, such as 1394, UWB, PCI or Bluetooth, when it must be accordingly equipped and installed with in the mainframe 102 a driver program which transforms those said interfaces into USB interface, otherwise, the said device 100 can not appear as a USB CDROM device. In purpose of simple statement, the said storage device 100 of safety management refers to the one comprising the USB interface circuit 108 if there is no additional description below.

The said storage device 100 of safety management also comprising a storage media 114 which connects with the said control unit 110, consisting of the common (but not limit to) physical devices of NAND FLASH, AND FLASH or NOR FLASH etc. An independent and invisible area 116, 118 is defined in the said storage media 100 to store different kinds of encryption keys or decryption keys, in order to prevent these data from simple physical duplication. The ordinary data including encryption software and decryption software data can be put into the visible area 120, 122. While the said storage device 100 is connected to the mainframe 102, the encryption software don't need to be installed, it can run automatically and through the technology of CDROM updating on line which conforms to the SCSI (small computer serial interface) add the software function or amend the safety loophole.

The said storage device 100 of safety management can also comprise an integrated circuit module 124 which connects with the said control unit 110, providing a unique identifier (ID number) which can distinguish the said device 100 from other devices of the same type, preventing the encryption key from further physical duplication: While the said USB control unit 108 receives the order of writing an encryption key or other key data into the storage media 114, the ID number of the said storage device 100 of safety management should be read first, then after predetermined transformation, be used for encrypting the data which will be wrote in, then the operation of writing the storage media 114 can be done.

Figure 6:
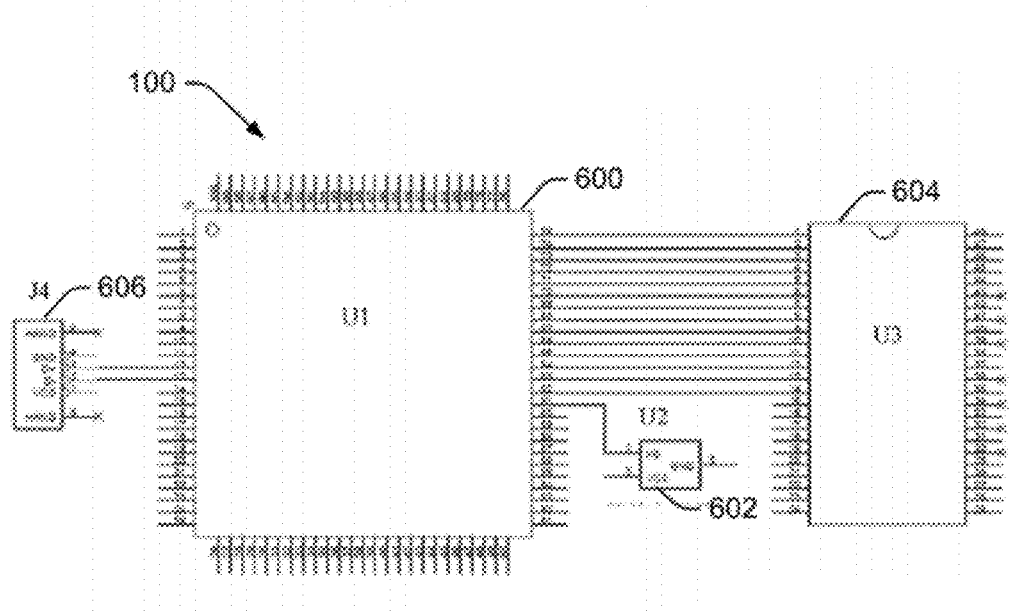
FIG. 6 is the electric diagram of the storage device of safety management of the present invention.

FIG. 6 is the present embodiment of the electric diagram of the storage device 100 of safety management. Wherein, the said USB control unit is realized by the integrated circuit U1 600, the said ID number is provided by the integrated circuit U2 602 (e.g. but not limit to DS2411); the storage media comprises the storage chip U3 604. The said USB interface circuit comprises the connect-plug terminator J4 606 which electrically connects with the U1 600.

For data security, random numbers can be adopted to encrypt the key data (e.g. encryption key) in the communication process between the mainframe 102 and the storage media 114 during the running of encryption software, so to prevent the key data from being broken illegally. Taking the encryption key read by the mainframe 102 for example, the ID number of the storage device 100 of safety management should be read by the USB control unit 110 to do relevant transform, then be used to decrypt the data of encryption key which is read; After that, the mainframe 102, through the encryption software, shakes hands with the control unit 110 to mutual interchange a random number which is produced by themselves; then the said control unit 110 use the data transformed from these two random numbers to encrypt the decrypted encryption key, then pass the encrypted data to the mainframe 102 through the encryption software. Thus, the normal illegal software can not elicit the encryption key by simulate answering and break the encryption software.

The unique identifier setting for the said storage device 100 of safety management and the encrypted storage 114, and the method of using the random number for encryption in the communication process will enhance the safety degree of the whole management software of the document.

In order to satisfy the need of multiple levels of document safety management of enterprise users, the said storage device 100 of safety management can be distinguished into parent device and subsidiary device, endowed with different management authority. The parent device can be managed or stored by the operator in the document control center, there are a plurality of certified encryption keys saved in its storage media 114; The document encryption authority can be set (e.g. whether to set the restriction of printing or not, set reading prohibition to the subsidiary device, or set the times of allowing the subsidiary device to read) while using the device to encrypt the document. Each of the subsidiary devices can be distributed to the trusty users, the encryption key which is stored in its storage media comes from the parent device, standing for a certain use authority. The subsidiary device can also be used to encrypt the document, but the encrypted document prohibits all operations except reading. In order to manage the system conveniently, a further appointment can be made in the management software: the encryption key only can be transmitted from the parent device which inserted on one mainframe to the subsidiary device, or be backed between the parent devices; the encryption key saved in the subsidiary devices can not be duplicated and transmitted between each other. Besides, because a plurality of encryption keys are supported by the said parent device and subsidiary device, and that which encryption key would be chosen is unfixed while encrypting the document, in order to promise to decrypt every encrypted document, the serial number information of the chosen key should be contained in the encryption information of the encrypted document. In order to facilitate the centralized and dynamic authority management, the authority saved in the said storage device of safety management can be updated through mainframe 102 or net; e.g. the use right of the predetermined storage device 100 of safety management can be logged out remotely through net: while the said storage device 100 of safety management is wrote into a scheduled invalid data, the said encryption key and the association information (e.g. but not limit to decryption key) will be invalid.

In order to be clearly illustrated, the above scattered description of the safety management methods of electronic document can be sum up in following steps, comprising:

A. Set up at least a storage device 100 of safety management, write at least one encryption or decryption key into its storage unit 114.
B. Distribute the said storage device 100 of safety management to the predetermined users;
C. The said predetermined users connect the said storage device 100 of safety management to a PC/mainframe with Windows operation system, then the said device 100 should be enumerated as a USB CDROM device at least by the system;
D. The loading program, in the said storage device 100 of safety management, inject the encryption or decryption module into the scheduled program process of the said common reading software in the PC/mainframe operation system 112 through the technology of remote thread injection and function hook, so as to take over the scheduled operation ran by the said common reading software;
E. The said predetermined users encrypt the electronic document of predetermined file type to generate encrypted electronic document with the same file type, or open the encrypted electronic document of the predetermined file type by using the said common reading software; Wherein, the said predetermined file type is the sustainable file type of the said common reading software.

In order to guarantee the encrypted document can not be read after the said storage device 100 of safety management is lost or the use right is logged out, while encrypting the electronic document, the said step E can set the authority information comprising the times of reading the document or the reading time etc, and the encryption information comprising the serial number of the keys; The said common reading software is managed under the operation authority after the encrypted electronic document is opened. Take the setting of times for example, the limited times descend while the users decrypt and read the document every time; when it descends to zero, the said storage device 100 of safety management can not be used for decrypting. If it adopts timer restriction, the timer will be read in every time decrypting, if it is judged to be out of date, the use right of the said storage device 100 of safety management can also be logged out.

Figure 4:
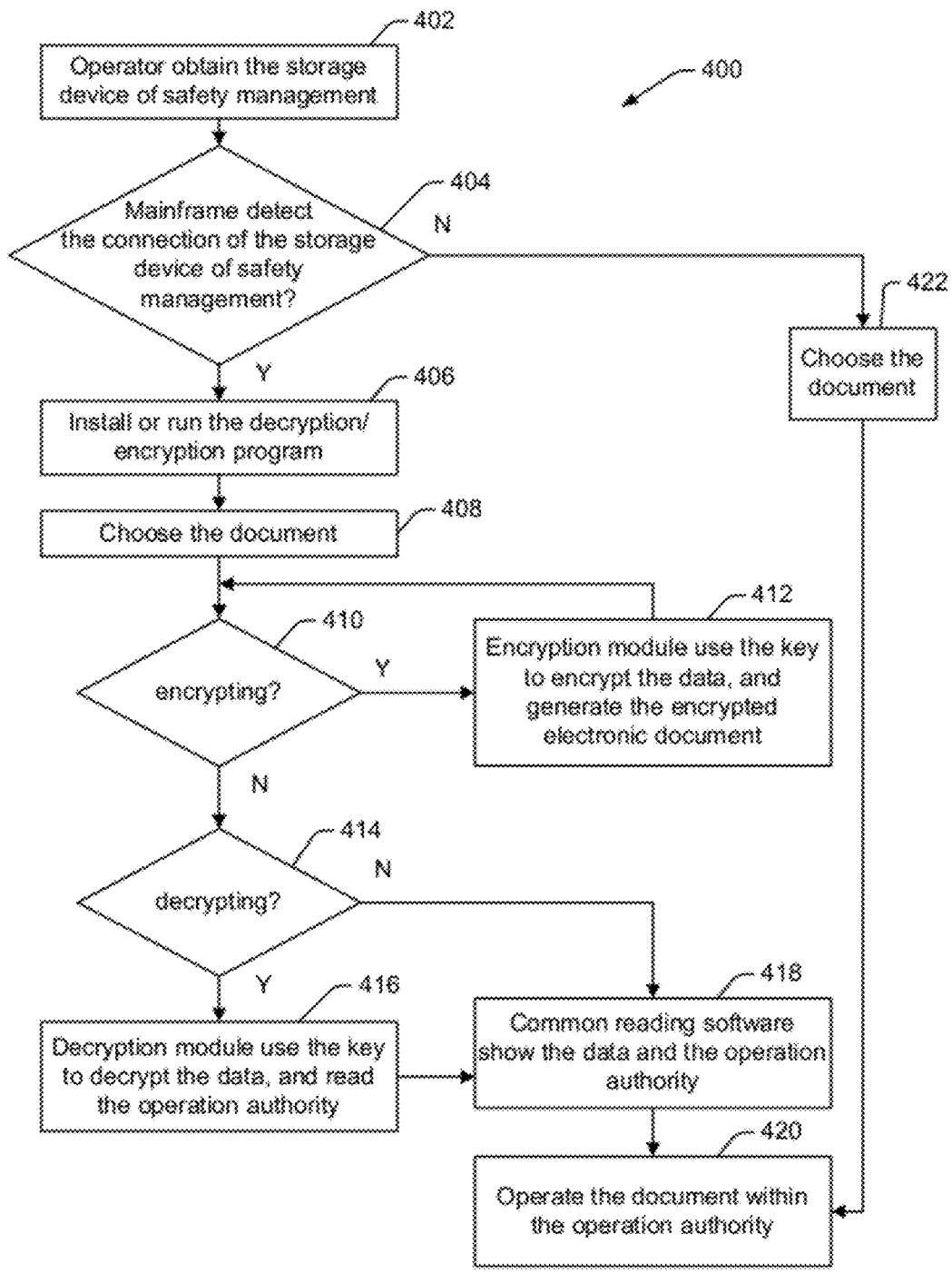
FIG. 4 is the flow sketch of safety management method of the document.

FIG. 4 is the flow sketch of the safety management method 400 of the document, applying to the client port of the individual user or the enterprise (they will be called operators in the following), the document can be encrypted or decrypted on any of the mainframe installed with common reading software. The operators should obtain 402 the said storage device of safety management first; while the storage device of safety management connected to the mainframe, the said mainframe detect 404 it, and enumerate the device at least as a USB CDROM device, then running 406 the decryption or encryption program which stored in the device automatically, injecting the encryption or decryption module into the scheduled program process of the said common reading software in mainframe operation system through the technology of remote thread injection and the technology of and function hook, taking over the operation ran by the common reading software; the operator can choose 410 to encrypt 412 a document to generate an encrypted electronic document while he choosing the document; if the chosen document is judged 414 as an encrypted electronic document, the decryption module can be chose to decrypt 416 the data of the said document and read the information of the operation right, then the operator can use 418 the common reading software to show and operate 420 the document. If the said storage device of safety management is pulled out of the mainframe, the said mainframe operation system will automatically log out the corresponding opening operation right of the document it takes over (delete the optional item of encrypting transformation in the operating prompt-menu of right-hand key click of the document at the same time), restore the normal operation 422 of the common reading software, the normal document can be opened and the relevant operation comprising read, print, clipboard work and screen shot etc. can be done; but for a chosen encrypted document, when opened, only unreadable codes would be showed.

More specifically, the document encrypting method of the said electronic document safety management of present invention comprising following steps:

A. Set up or install 406 the encryption program on a PC or mainframe;
B. Operate 416, 418 the PC/mainframe to read the data of an electronic document which will be encrypted;
C. Encrypt the said data 410 by using an encryption key;
D. Generate an encrypted electronic document 412 which has the same file type as the said electronic document.

Figure 5:
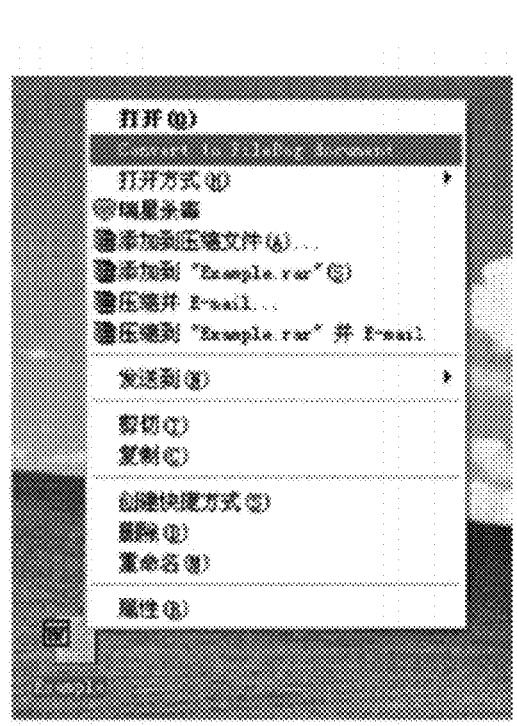
FIG. 5 is sketch of choosing the optional item of encryption transformation to encrypt.

Wherein, the said PC/mainframe can be configured with Windows operation system, comprising Windows 2000 or Windows XP. The encryption program (comprising encryption module and its loading program) can be stored in a storage device (e.g., the said storage device 100 of safety management in the present embodiment) or also can be installed on the mainframe 102. Take the former as an example, while the storage device 100 is connected to the mainframe 102 and enumerated as a USB CDROM device by the system, because the system has the function of playing CDROM automatically (if not, operator can enable this function in advance), the encryption program runs automatically and registers a plug-in program in the system, so after that the users can choose a document of a predetermined file type, and use the right-hand key of the mouse to click, it will add an optional item of encrypting transformation (showed in FIG. 5: Convert to filedog document . . . ) in the operating prompt-menu, then relate to and take over the opening program for the documents with this type. Thus, the said step B can also comprise the process: operate the mainframe 102 to choose the electronic document which will be encrypted; then choose the encrypting transformation option in the hint menu of the document operation; the mainframe 102 will read the document data in the end. Of course, the said step B can also be combined with the common reading software, choosing the document which will be encrypted first, and then opening the document through using the said common reading software, the encryption and save operation will be done on the interface of said software.

In order to finish the above-mentioned processing and increase the security at the same time, the loading program which is in the said encryption program doesn't encrypt and decrypt the document by itself; apart form registering the said plug-in program in the system, it injects the encryption module in the corresponding program processing in the operation system. Of course the encryption module can run in the encryption program directly without being injected to other process. Taking the Windows 2000 or above operation system for examples, the explore.exe process can be used (but not limited). Because the said process is a permanent registering process (while the operation system starts, it runs with the system and can not be closed), the said encryption module can be injected into the said processing through remote thread injection technology and function hook technology, taking over the core read-write function. The said function hook technology is a technology which enables the said running function skip to other entry addresses to carry out a specific function through dynamically modifying the particular function initial address which got at the time of the program or the binary system document of the dynamic library being loaded to the memory space for running. Both of the technologies are provided on the Windows operation system platform of Microsoft. The remote thread injection can be realized through the CreateRemoteThread function provided by the system, (see the MSDN exploitation document of Microsoft for details). The function hook technology has many realizing ways, e.g. using the standard information hook technology and Detours provided by the Microsoft, or Windows API Hook exploited by the some domestic developers to realize it. Wherein, the information hook technology can be realized through the SetWindowsHookEx function of the system. Detours is a kind of specialized provided technology, see the issued document 《Detours: Binary Interception of Win32 Function》on the third "USE NIX Windows NT" seminar, held in Seattle, Wash., July 1999. There are also some professional documents which introduce the API Hook technology on websites. The technical theory of those realizing ways is essentially the same, using the write function while encrypting the document, to finish the additional encryption work automatically first, then write the encrypted electronic document data which need to be stored into the mainframe storage unit. Moreover, the encrypted document, brought about according to the said encryption method, will not change the type of original document, i.e., maintain the original file extension name. This encrypted electronic document allows the secondary spread.

During the processing above, the arithmetic in said step C, using the encryption key to encrypt the electronic document data, can adopts the any of the existing encryption formula, function and combination, the unnecessary details will not be given here for it is not the core of present invention. The encryption information of the said encrypted electronic document in step D can comprise information of the authority setting and the serial number information of the encryption key adopted.

Besides, another important content of the present invention is the document decryption methods used for the safety management of the said electronic document, comprising steps:
A. Download or store the encrypted electronic document into the storage unit 126 of a PC or mainframe 102;
B. Finish the installation of a common reading software corresponding to the file type of the said electronic document on the said PC/mainframe 102;
C. Connect a storage device 100 with the content of decryption authority to the said PC/mainframe 102;
D. The storage device 100 is recognized by the said PC/mainframe 102, the document decryption program which is in the said storage device 100 is run automatically;
E. The said document decryption program automatically take over the scheduled operation run by the said common reading software;
F. Run the said common reading software to open the said encrypted electronic document, operate the document within the predetermined range of the rights.

Wherein, the said storage device is the storage device 100 of safety management in present embodiment, with USB interface 108 and control unit 110, located as "USB Mass Storage Device", in the said step D, the mainframe 102 identifies and according to the protocol enumerates the storage device 100 as a "USB CDROM" device at least, making the authority decryption program of the said document can be run automatically. The said document decryption program (comprising decryption module and its loading program) can be programmed individually, or can be programmed together with the said encryption program, using the same loading program to carry out the remote thread injection of the encryption and decryption module respectively.

Therefore, it is similar to the said document encryption method, the technology of the remote thread injection and the function hook of Windows can also be used for decryption. In the said step E, through the remote thread injection technology and function hook technology, the decryption program of document can inject the decryption module into the scheduled program process of the predetermined said common reading software in the mainframe operation system 112, and then take over the related operation predetermined by the said common reading software; thus, the step F can comprise the processing procedures: while the mainframe 102 is operated to open the said encrypted electronic document, the read operation of the said common reading software is taken over and controlled by the said decryption module; read the data of the encrypted electronic document; use the decryption key in the decryption module to restore the said data and read the predetermined operation authority in the encryption data; the restored document data and document operation authority can be showed on the interface of the common reading software finally. While a document is chosen by operating the mainframe 102, the decryption program which registers and takes over the document will check the document to see whether it is an encrypted document; if it is not, then the said common reading software can be run to read or operate it directly. The said operation authority of document comprises read-write disc, print document, clipboard function and plugboard management etc. matching along with corresponding functional functions. When an authority is effective and the corresponding operation is started, the corresponding read-write function of said operation can be taken over. Wherein, while the encrypted electronic document data is read by the mainframe 102, the corresponding decryption key is chose from the decryption module according to the key serial number in the encryption information of the said encryption data; the decryption processing can be carried out in the scheduled process of the said common reading software and the decrypted date will be showed by the common reading software directly. Thus, the said decryption and showing processing will not remain any processing data on other permanent storage medium, which can enhance the security of the data.

In the processing above, the said storage device 100 can bring the using authority information of the document on it, coordinating with scheduled operation authority which read from the encryption data to limit the operator's use of the said encrypted electronic document.

The whole decryption processing can not be tracked and broken because it is run in the process of the original common reading software, the security and authority management of the document can manage the confidential document limberly with high security according to the information of the encrypted document; at the same time, the operation is simple and transparent for users.

The invention claimed is:

1. A method of encrypting an electronic document for safety management of the electronic document, comprising steps of:

installing an encryption program on a PC or mainframe;

operating the PC/mainframe to (i) choose an electronic document which will be encrypted, (ii) choose an optional item of encrypting transformation in an operating prompt-menu of said electronic document, and (iii) read data of the electronic document which will be encrypted;

encrypting said data by using an encryption key; and generating an encrypted electronic document which has a same file type as said electronic document.

2. The method of encrypting the electronic document according to claim 1 wherein the encryption program is stored in a safety management storage device such that when connected to said PC/mainframe said storage device functions as a USB CDROM device by the PC/mainframe system so that said encryption program runs automatically.

3. The method of encrypting the electronic document according to claim 1 wherein said encrypted electronic document contains encryption information which comprises information of authority settings, or serial number of encryption keys.

* * * * *